United States Patent
Wilson et al.

(10) Patent No.: US 10,225,911 B2
(45) Date of Patent: Mar. 5, 2019

(54) EMERGENCY SIGNALING FOR POWER OVER ETHERNET SYSTEMS

(71) Applicants: TRIDONIC GMBH & CO KG, Dornbirn (AT); ZUMTOBEL LIGHTING INC., Highland, NY (US)

(72) Inventors: Ian Wilson, Sunderland (GB); Giulio Borsoi, Dornbirn (AT); Gabor Schmidt, Dornbirn (AT); Arman Bastani, Costa Mesa, CA (US)

(73) Assignees: TRIDONIC GMBH & CO KG, Dornbirn (AT); ZUMTOBEL LIGHTING INC., Highland, NY (US)

( * ) Notice: Subject to any disclaimer, the term of this patent is extended or adjusted under 35 U.S.C. 154(b) by 0 days.

(21) Appl. No.: 15/742,569

(22) PCT Filed: Jul. 4, 2016

(86) PCT No.: PCT/IB2016/054006
§ 371 (c)(1),
(2) Date: Jan. 8, 2018

(87) PCT Pub. No.: WO2017/017546
PCT Pub. Date: Feb. 2, 2017

(65) Prior Publication Data
US 2018/0192499 A1    Jul. 5, 2018

Related U.S. Application Data

(60) Provisional application No. 62/196,484, filed on Jul. 24, 2015.

(51) Int. Cl.
*H02J 3/46*     (2006.01)
*H05B 37/02*    (2006.01)
(Continued)

(52) U.S. Cl.
CPC ......... *H05B 37/0263* (2013.01); *H04L 12/10* (2013.01); *H04L 12/12* (2013.01);
(Continued)

(58) Field of Classification Search
CPC .... H05B 37/0254; H05B 37/0263; H02J 9/00
(Continued)

(56) References Cited

U.S. PATENT DOCUMENTS

2006/0168459 A1* 7/2006 Dwelley ............... H04L 12/10
                                                   713/300
2010/0007473 A1  1/2010 Fadel
(Continued)

FOREIGN PATENT DOCUMENTS

EP    2 426 854    8/2011
GB    2535807      8/2016
(Continued)

OTHER PUBLICATIONS

International Search Report and Written Opinion in parent PCT Application PCT/IB2016/054006.

*Primary Examiner* — Thuy Vinh Tran
(74) *Attorney, Agent, or Firm* — Andrus Intellectual Property Law

(57) ABSTRACT

The present invention is in the field of Power over Ethernet (PoE) systems comprising a power supply module and an operation module with an emergency operation mode for operating lighting means, wherein the power supply module supplies a supply voltage via a data cable to the operation module. Especially, the present invention relates to power supply modules, preferably Power Sourcing Equipments (PSE) according to the PoE standard; operation modules with an emergency operation mode, preferably Powered devices (PD) according to the PoE standard; PoE systems, comprising such power supply modules and operation mod-
(Continued)

ules; and a detection method for detecting whether an operation module is arranged for operating lighting means in an emergency operation mode as well as an emergency operation mode triggering method for triggering an operation module to operate lighting means in an emergency operation mode.

9 Claims, 5 Drawing Sheets

(51) Int. Cl.
*H04L 12/10* (2006.01)
*H04L 12/40* (2006.01)
*H04L 12/12* (2006.01)
*H02J 9/00* (2006.01)
*H05B 33/08* (2006.01)

(52) U.S. Cl.
CPC ... *H04L 12/40143* (2013.01); *H05B 37/0254* (2013.01); *H02J 9/00* (2013.01); *H05B 33/0887* (2013.01)

(58) Field of Classification Search
USPC .................. 315/86, 185 R, 291; 307/24, 25
See application file for complete search history.

(56) References Cited

U.S. PATENT DOCUMENTS

| | | |
|---|---|---|
| 2011/0202784 A1 | 8/2011 | Mizutani |
| 2016/0091217 A1* | 3/2016 | Verberkt ................. G06F 8/654 700/276 |
| 2016/0092198 A1* | 3/2016 | Vangeel ................. G06F 8/654 717/173 |
| 2016/0273722 A1* | 9/2016 | Crenshaw ............. H02J 7/0021 |
| 2018/0019884 A1* | 1/2018 | Radermacher .......... H04L 12/10 |
| 2018/0183264 A1* | 6/2018 | Crenshaw ............. H02J 7/0021 |

FOREIGN PATENT DOCUMENTS

| | | |
|---|---|---|
| WO | 2011124723 | 10/2011 |
| WO | 2015028210 | 3/2015 |

* cited by examiner

EMERGENCY SIGNALING FOR POWER OVER ETHERNET SYSTEMS

The present application is the U.S. national stage application of International Application PCT/IB2016/054006, filed Jul. 4, 2016, which international application was published on Feb. 2, 2017 as International Publication WO 2017/017546 A2. The International Application claims priority to U.S. Provisional Application 62/196,484, filed Jul. 24, 2015.

FIELD OF THE INVENTION

The present invention is in the field of Power over Ethernet (PoE) systems comprising a power supply module and an operation module with an emergency operation mode for operating lighting means, wherein the power supply module supplies a supply voltage via a data cable to the operation module. Especially, the present invention relates to power supply modules, preferably Power Sourcing Equipments (PSE) according to the PoE standard; operation modules with an emergency operation mode, preferably Powered devices (PD) according to the PoE standard; PoE systems, comprising such power supply modules and operation modules; and a detection method for detecting whether an operation module is arranged for operating lighting means in an emergency operation mode as well as an emergency operation mode triggering method for triggering an operation module to operate lighting means in an emergency operation mode.

BACKGROUND AND OBJECT OF THE INVENTION

In order to save costs, wiring and installation of electric power supply networks Power over Ethernet (PoE) systems have been developed, in which a power supply module supplies an operation module with a supply voltage via a data cable, i.e. the data and electric power are integrated on the same cable. Thus, in such a system the power supply module acts as a voltage source and supplies the operation module with electric power via the data cable and the operation module is supplied with a current by the power supply module via the data cable. The PoE systems are standardized under IEEE 802.3af. A power supply module that is arranged for being used in a PoE system is called Power over Ethernet Power Sourcing Equipment (PoE PSE) or in short Power Sourcing Equipment (PSE) and an operation module that is arranged for being used in a PoE system is called Power over Ethernet Powered Device (PoE PD) or in short Powered Device (PD).

The main advantage of PoE systems is that you can save the electric power supply cable and supply devices comprising an Ethernet interface with electric power or electricity via the data cable.

PDs can be IP telephones, cameras or wireless transmission devices consuming little power.

Furthermore, PoE is used in systems comprising lighting means, preferably LEDs, for supplying inter alia the lighting means with electric power. In such a PoE system a PD can correspond to an operating device for operating lighting means, preferably a LED string comprising at least one or more LEDs (arranged in series and/or in parallel), wherein the PD 104 is provided with a lighting means converter. PoE systems comprising lighting means can also comprise other electronic devices as PDs, such as sensors, actuators etc. For example with regard to electric devices installed in a building, a PoE system can comprise lighting means, shutter means for shading windows, air condition means etc. as PDs.

In systems comprising lighting means the provision of an emergency operation mode is a common function. In such a mode the lighting means can be operated to consume less power by for example reducing the light emission (dimming the lighting means) compared to the light emission in the normal operation mode. However, it is also possible that the lighting means are operated in an emergency operation mode in order to consume more power compared to the normal operation mode. During an emergency operation mode certain lighting means in the system can be switched off, while other lighting means can be kept on or can be switched on in the system.

The documents GB 1503684.1 and WO 2011/124723 A1 disclose systems comprising lighting means with an emergency operation mode.

In view of the prior art, it is an object of the present invention to implement an emergency operation mode in an PoE system comprising lighting means, so that operating modules/PDs that are arranged for operating the lighting means in an emergency operation mode can be triggered to operate the lighting means in the emergency operation mode during the operation phase of the PoE system.

This object is achieved by power supply modules, operation modules, Power over Ethernet (PoE) systems, a detection method and an emergency operation mode triggering method as described herein.

SUMMARY OF THE INVENTION

According to one aspect of the invention a power supply module, preferably a power sourcing equipment (PSE), adapted for use in a power over Ethernet (PoE) system is proposed, wherein the power supply module comprises:

voltage supply means for supplying, during a first detection phase, at least a first voltage via a data cable to an operation module for operating lighting means, preferably a powered device (PD), and detection means for detecting, during the first detection phase, whether the operation module is arranged for being supplied with a supply voltage via the data cable during an operation phase, wherein the voltage supply means are adapted to supply, during a second detection phase, a second voltage via the data cable to the operation module, the detection means are adapted to detect, during the second detection phase, whether the operation module is arranged for operating the lighting means in an emergency operation mode, and the voltage supply means are adapted to supply, in an operation phase, the operation module with the supply voltage via the data cable, and, wherein the power supply module only performs the second detection phase and the operation phase, if the detection means detect, during the first detection phase, that the operation module is arranged for being supplied with the supply voltage via the data cable, the power supply module performs the operation phase after the second detection phase, and the second voltage is higher than the first voltage, but lower than the supply voltage.

This power supply module or PSE is advantageous, as it can know whether the operation module or PD connected via the data cable is arranged for operating the lighting means in an emergency operation mode.

Furthermore, the voltage supply means of the power supply module may be adapted to supply, during the operation phase, a third voltage via the data cable to the operation module in order to trigger the operation module to operate the lighting means in the emergency operation mode, wherein the third voltage is higher than the first voltage, but lower than the supply voltage.

Further, the third voltage may correspond to the second voltage.

Moreover, the voltage supply means of the power supply module may be adapted to supply the supply voltage, the second voltage or a voltage greater than the second voltage and smaller than the supply voltage via the data cable to the operation module operating the lighting means in the emergency operation mode.

The above optional features can be arbitrarily combined according to the invention, in order to provide the power supply module according to one aspect of the invention.

Furthermore, the operation module may comprise receiving means for receiving a first and second voltage via a data cable from a power supply module, preferably a power sourcing equipment (PSE), during a first and second detection phase, respectively, wherein the receiving means receive a supply voltage via the data cable from the power supply module during an operation phase, and, wherein the operation phase is after the first and second detection phase, and the second voltage is higher than the first voltage, but lower than the supply voltage.

Further, the receiving means may be adapted to draw a first and second current in response to the first and second voltage, respectively, wherein the first current indicates to the power supply module that the operation module is arranged for being supplied with the supply voltage over the data cable, and the second current indicates to the power supply module that the operation module is arranged for operating the lighting means in the emergency operation mode.

Moreover, the operation module may be triggered to operate the lighting means in the emergency operation mode, when the receiving means are receiving a third voltage instead of the supply voltage during the operation phase, wherein the third voltage is higher than the first voltage, but lower than the supply voltage.

In addition, the third voltage may correspond to the second voltage.

The above optional features can be arbitrarily combined according to the invention, in order to provide the operation module according to the above aspect of the invention.

According to another aspect of the invention a power over Ethernet (PoE) system is proposed, wherein the power over Ethernet system comprises a power supply module according to the above aspect of the invention and an operation module according to the above aspect of the invention, wherein the power supply module and the operation module are connected via a data cable.

According to a further aspect of the invention a power supply module, preferably a power sourcing equipment (PSE), adapted for use in a power over Ethernet (PoE) system, is proposed, wherein the power supply module comprises voltage supply means for supplying, during a detection phase, at least a first voltage via a data cable to an operation module for lighting means, preferably a powered device (PD), and detection means for detecting, during the detection phase, whether the operation module is arranged for being supplied with a supply voltage via the data cable during an operation phase, wherein the voltage supply means are adapted to supply, during the operation phase, a second voltage via the data cable to the operation module in order to trigger the operation module to operate the lighting means in an emergency lighting mode during the operation phase, wherein the power supply module only performs the operation phase, if the detection means detect during the detection phase that the power supply module is arranged for being supplied with the supply voltage via the data cable, the power supply module performs the operation phase after the detection phase, and the second voltage is higher than the first voltage, but lower than the supply voltage.

Furthermore, the voltage supply means may be adapted to supply a voltage that is smaller than or equals to the supply voltage via the data cable to the operation module operating the lighting means in the emergency operation mode.

According to a further aspect of the invention, an operation module, preferably a powered device (PD), is proposed, wherein the operation module is arranged for operating lighting means in an emergency operation mode, and adapted for being supplied by a power over Ethernet (PoE) system.

Furthermore, the operation module may comprise receiving means for receiving a first voltage via a data cable from a power supply module, preferably a power sourcing equipment (PSE), during a detection phase, receiving means for receiving a supply voltage via the data cable from the power supply module during an operation phase, wherein the operation module is triggered to operate the lighting means in the emergency operation mode, when receiving a second voltage instead of the supply voltage during the operation phase, the operation mode is after the detection mode, and the second voltage is higher than the first voltage, but lower than the supply voltage.

According to a further aspect of the invention a power over Ethernet (PoE) system is proposed, wherein the power over Ethernet system comprises a power supply module according to the further aspect of the invention, and an operation module according to the further aspect of the invention, wherein the power supply module and the operation module are connected via a data cable.

According to another aspect of the invention a detection method is proposed for detecting, whether in a power over Ethernet (PoE) system, an operation module, preferably a powered device (PD), which may be supplied with a supply voltage via a data cable from a power supply module, preferably power sourcing equipment (PSE), during an operation phase, is arranged for operating lighting means in an emergency operation mode, wherein the detection method comprises the following steps:

the power supply module supplies, during a first detection phase, at least a first voltage via the data cable to the operation module, the power supply module detects, during the first detection phase, whether the operation module is arranged for being supplied with a supply voltage via the data cable during the operation phase, the power supply module supplies, during a second detection phase, a second voltage via the data cable to the operation module, the power supply module detects, during the second detection phase, whether the operation module is arranged for operating the lighting means in an emergency operation mode, and the power supply means supplies, during an operation phase, the operation module with the supply voltage via the data cable, wherein the power supply module only performs the second detection phase and the operation phase, if the power supply module detects during the first detection phase that the power supply module is arranged for being supplied via the data cable with the supply voltage, and the second voltage is higher than the first voltage, but lower than the supply voltage.

According to another aspect of the invention an emergency operation mode triggering method is proposed for triggering in a power over Ethernet (PoE) system an operation module, preferably a powered device (PD), for operating lighting means to operate the lighting means in an emergency operation mode, wherein the operation module is supplied with a first voltage via a data cable from the power supply module during a first detection phase, respectively, and the operation module is supplied with a supply voltage via a data cable from the power supply module during the operation phase. The emergency operation mode triggering method comprises the following step: the power supply module supplies a second voltage via the data cable to the operation module during the operation phase in order to trigger the operation module to operate the lighting means in the emergency operation mode, wherein the power supply module performs the operation phase after the first detection phase, and the second voltage is higher than the first voltage, but lower than the supply voltage.

Furthermore, the operation module may be supplied with a third voltage via a data cable from the power supply module during a second detection phase, wherein the power supply module performs the second detection phase before the operation phase and after the first detection phase, and the second voltage may correspond to the third voltage.

According to a still further aspect the invention proposes an Emergency lighting module, arranged for being supplied with a DC voltage of a power over Ethernet (PoE) system.

The lighting module comprises a control circuitry arranged for starting the operation of emergency lighting means of the lighting module if it is supplied with a DC voltage level which is lower than a DC voltage level for normal operation mode.

BRIEF DESCRIPTION OF THE FIGURES

Further advantages, features and characteristics of the present invention will now be described by way of example, with reference to the accompanying drawings, in which.

DETAILED DESCRIPTION OF THE FIGURES

Figure 1:
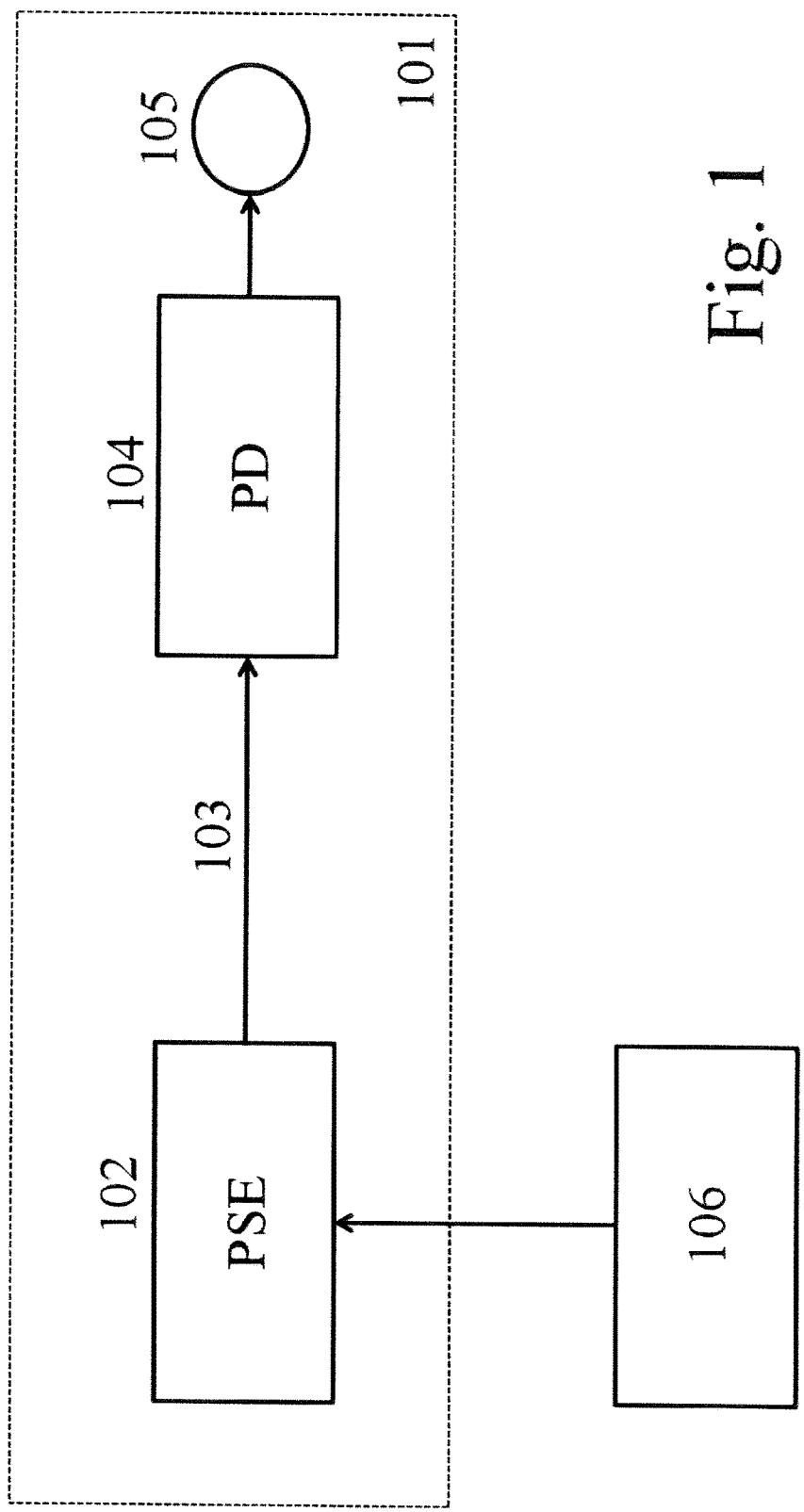
FIG. 1 shows an exemplary embodiment of a Power over Ethernet (PoE) system according to the present invention.

FIG. 1 schematically shows a Power over Ethernet (PoE) system 101 according to the present invention. The PoE system 101 comprises at least a power supply module 102 and at least an operation module 104, wherein the one operation module 104 is connected to the power supply module 102 via the data cable 103.

The power supply module 102 corresponds to a PoE Power Sourcing Equipment (PSE), the operation module 104 corresponds to a PoE Powered Device (PD) and the data cable 103 corresponds to an Ethernet connection. Preferably the PoE standard corresponds to the IEEE 802.3af standard.

In the following the present invention will be described with respect to the PoE standard and, thus, the power supply module 102 will be referred to by the wording "PSE" and the operation module 104 will be referred to by the wording "PD".

The PSE 102 acts as a voltage source and supplies the PD 104 with a supply voltage via the data cable 103. The PD 104 is supplied with electric power by the PSE 102 over the data cable. The PD 104 can be for example an operating device for operating lighting means.

The PD 104 is provided with a lighting means converter, such as a LED converter, which may operate the lighting means at a controlled, preferably feedback-controlled current and/or voltage value, and which may boost or reduce the voltage supplied by the PSE 102.

Preferably, the PD 104 is arranged for driving a LED string 105 with at least one or more LEDs (arranged in series and/or in parallel) (as shown in FIG. 1).

Therefore, for the following description of the present invention the PD 104 is assumed to be an operating device for operating lighting means, preferably a LED driver for driving a LED string with at least one LED. However, according to the invention, the PD 104 can be any other electronic device that is capable of being supplied with electric power via a data cable, such as sensors, actors etc.

The PSE 102 is supplied with electric power from the energy source 106. In an normal operation mode the PSE 102 is preferably supplied with mains power or mains voltage from a mains line via the energy source 106 and in an emergency operation mode (e.g. power supply from the mains line does not function properly) the PSE 102 is supplied with electric power or electricity from an battery of the energy source 106. This battery may be rechargeable and, thus, is recharged during the normal operation mode with electric energy, preferably with electric energy from the mains line, in order to be arranged to supply the PSE 102 with electric power in the emergency operation mode.

Therefore, in the normal operation mode of the PoE system 101 the PSE 102 is supplied with electrical power from mains line via the energy source 106 in order to supply a voltage (supply voltage) via the data cable 103 to the PD 104 during the operation phase, i.e. after an initiation or setup phase according to the PoE standard. In the emergency operation mode the PSE 102 is supplied with electrical power from the battery of the energy source 106 in order to supply the PD 104 with a voltage via the data cable 103 during the operation phase.

Preferably, the PSE 102 supplies in the emergency operation mode the supply voltage to the PD 104 that is also supplied in the normal operation mode. However the PSE 102 may also supply in the emergency operation mode a voltage that is lower or higher than the supply voltage.

The present invention mainly focuses on the signaling and supply of voltages regarding an emergency operation mode from the PSE 102 to the PD 104 via the data cable 103. Therefore, the above described energy supply of the PSE 102 in the normal operation mode and the emergency operation mode is only one possible example, and, thus, any methods known to the skilled person for supplying the PSE 102 with energy in the two different modes may be used according to the present invention.

Preferably, an energy supply of the PSE 102 as disclosed in the document GB 1503684.1 is used in the present invention.

Figure 4:
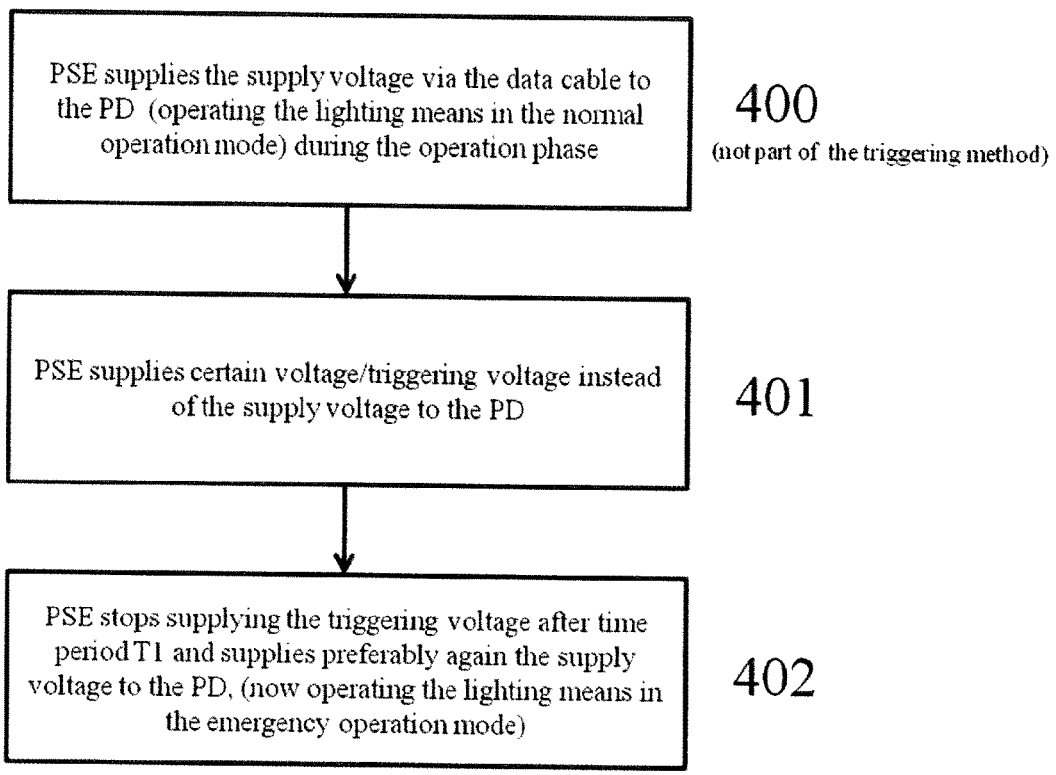
FIG. 4 shows an exemplary embodiment of the emergency operation mode triggering method for triggering an operation module to operate lighting means in an emergency operation mode.
Figure 5:
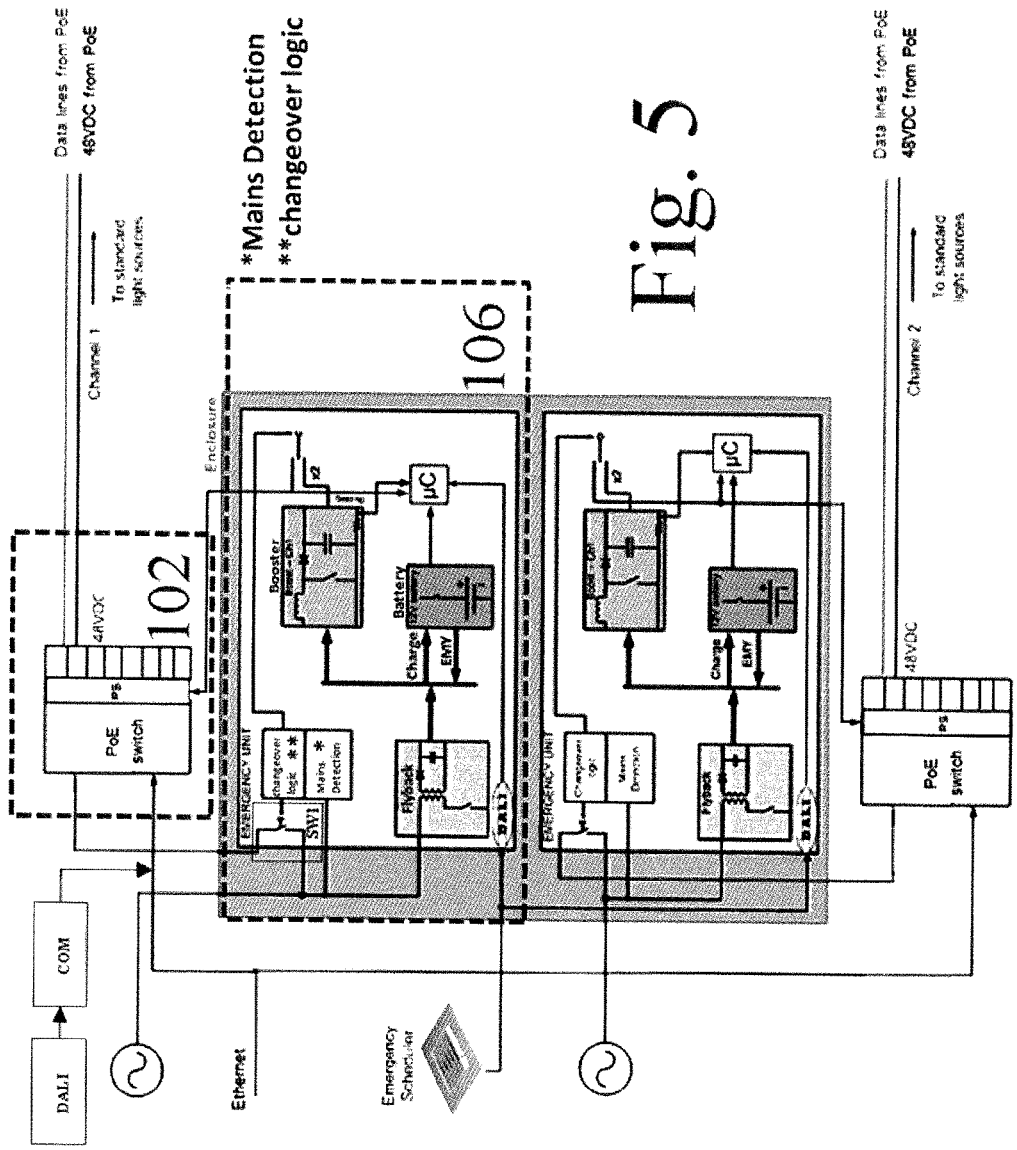
FIG. 5 shows an example of the energy source supplying the power supply module with electric power.

FIG. 5 shows such an energy supply of the PSE 102, i.e shows the components of the energy source 106 supplying the PSE 102 as outlined above. FIG. 5 basically corresponds to the FIG. 4 of the document GB 1503684.1 and the description thereof is incorporated herein by reference.

As can be seen in FIG. 5, the energy source 106 is supplied with electric energy/power from mains line. In a normal operation mode the electric power from the mains line is passed through (switched through/looped through) to the PSE 102 by the energy source 106, i.e. the electric power from the mains line is supplied to the PSE 102 by the energy source 106 in the normal operation mode.

Furthermore, the electric power is used in the energy source 106 to charge the battery of the energy source 106.

In an emergency operation mode the controller (micro controller) of the energy source 106 switches/changes the energy supply of the PSE 102, in that the PSE 102 is supplied with electric power from the battery of the energy source 106 and not anymore from the mains line. The electric energy of the battery may be boosted by a boost converter.

Usually the electric power supplied from the mains line in normal operation mode will be an AC voltage, e.g. of 230V with a frequency of 50 Hz. As the electric power from the battery of the energy source 106 supplied in emergency mode is typically a DC voltage the PSE 102 may detect this change of supplied power or voltage and may thus detect a changeover to emergency operation.

The PSE 102 may comprise one power input to receive both the electric power supplied from the mains line in normal operation mode and the electric power from the battery of the energy source 106 supplied in emergency mode at one input.

Alternatively the PSE 102 may comprise one power input to receive the electric power supplied from the mains line in normal operation mode and one power input to receive the electric power from the battery of the energy source 106 supplied in emergency mode.

The energy source 106 comprises a mains detection circuit, which monitors a mains voltage VMAINS supplied from an electrical mains supply. The mains detection circuit then issues a signal to a changeover logic, which, in case an emergency situation is detected, can operate the first switching element SW1 to cut off the PSE 102 from the electrical mains supply. Also a charging circuit is shown as a flyback converter, which can also be replaced by another suitable converter, while the output converter is shown as a boost converter, boosting the voltage of a 12V battery to 55 Volts DC which forms the electric power from the battery of the energy source 106 supplied in emergency mode.

Also shown in an exemplary variant is a communication module COM, which is connected to a command source, in particular a DALI bus DALI and servers to convert DALI commands to POE commands and preferably vice versa.

FIG. 5 also depicts that the PSE 102, the energy source 106 and the communication module COM can be separate and independently arranged modules. Alternatively at least two or all three mentioned modules may be applied close together, e.g. within a common enclosure.

Figure 2:
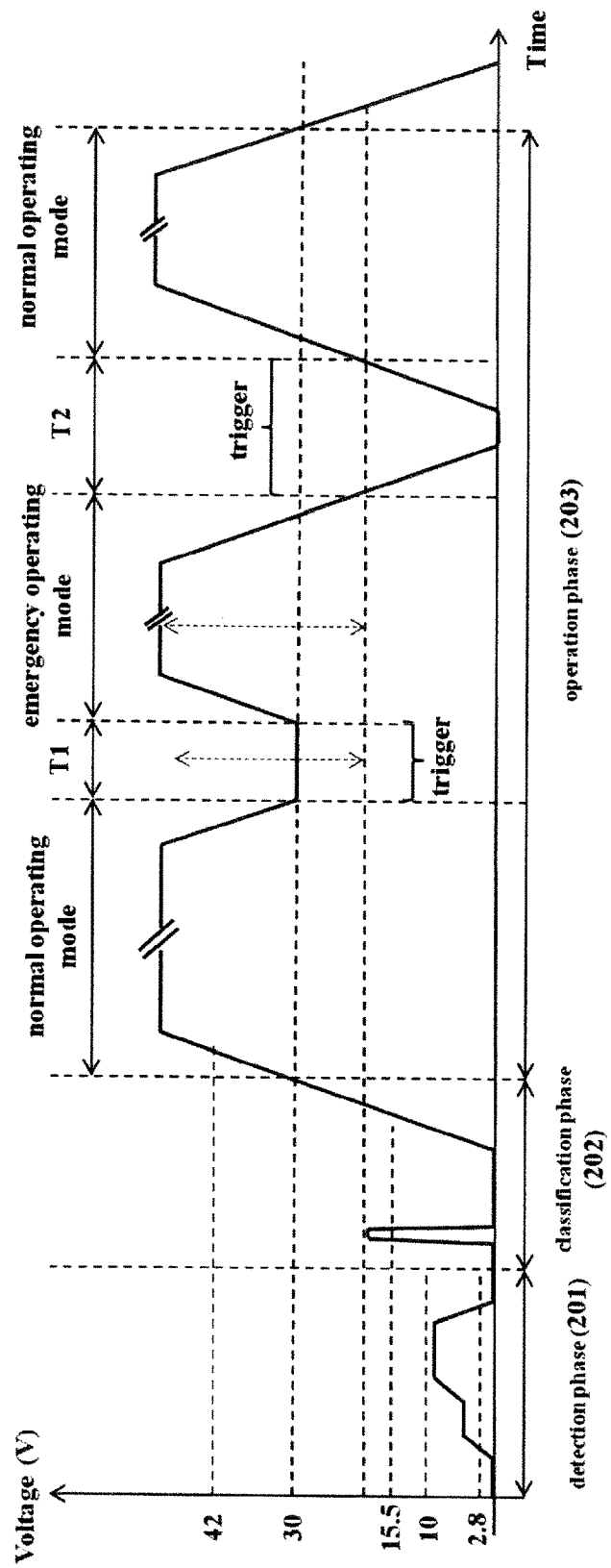
FIG. 2 shows a signaling of a power supply module of a PoE system according to the present invention.

FIG. 2 shows a signaling of the power supply module respectively PSE 102 of the PoE system 101 according to the present invention.

At the beginning the PSE 102 performs or carries out a detection or discovery process, in order to determine whether the operation module/PD 104 is arranged for being supplied with a supply voltage over the data cable 103, i.e. whether the operation module/PD 104 is a valid PD. This detection phase 201 is mandatory according to the PoE standard and is also called "PD detection". The method used by the PSE 102 to determine whether a PD is connected is called "Resistive Power Discovery".

During the detection phase 201 the PSE 102 supplies at least one voltage of a low level (which is harmless to pre-standard devices) to the PD 104. The PD 104 being a valid PD comprises according to the PoE standard a resistor with standard-defined value (around 25 kΩ) and, thus, a specific current is drawn by the PD 104 in response to the voltage of low level supplied by the PSE 102 during the detection phase 201. This current indicates to the PSE 102 that the PD 104 is arranged for being supplied with the supply voltage over the data cable.

Thus, the PSE 102 uses the standard defined resistor (around 25 kΩ), also called signature resistor, of the PD 104, by supplying a voltage of low level to the PD 104, in order to verify the existence of a valid PD.

In case the PSE 102 detects that a valid PD 104, i.e. an operation module/PD arranged for being supplied with a supply voltage via the data cable 103, is present, the PSE 102 continues with the PoE process (shown in FIG. 2) in order to supply to the PD 104 a supply voltage during the operation phase 203. In case the PSE 102 detects that anything other than a valid PD is connected via the data cable 103, the PSE 102 will not supply a supply voltage via the data cable 103.

Detection of Emergency Operation Mode

After the detection phase 201 an emergency detection process may be performed by the PSE 102 in order to detect or determine, whether an emergency condition is present and whether electric power is being supplied from the battery of the energy source 106.

In case that the PSE 102 has detected an emergency condition the PSE 102 supplies a certain or predetermined voltage via the data cable 103 to the PD 104, wherein this voltage is higher than the voltage used by the PSE 102 in the first detection phase 201, but lower than the supply voltage supplied by the PSE 102 to the PD 104 during the operation phase 203.

In case the PD 104 is arranged for operating the lighting means 105 in an emergency operation mode, the lighting means are operated preferably at a pre-defined emergency intensity level which may be below the maximum intensity, e.g. at a level of 70% or at maximum intensity level (e.g. for an exit sign).

Alternatively or in addition a classification process may be performed after the detection phase 201 by the PSE 102 in order to classify respectively detect or determine, whether the PD 104 is arranged for operating the lighting means 105 in an emergency operation mode.

Thus, during this classification phase 202 the PSE 102 supplies a certain or predetermined voltage via the data cable 103 to the PD 104, wherein this voltage is higher than the voltage used by the PSE 102 in the first detection phase 201, but lower than the supply voltage supplied by the PSE 102 to the PD 104 during the operation phase 203.

In case the PD 104 is arranged for operating the lighting means 105 in an emergency operation mode, the PD 104 draws a certain current in response to this voltage, wherein this current indicates to the PSE 102 that the PD 104 is arranged for operating the lighting means 105 in the emergency operation mode.

Thus, during the classification phase 202, the PSE 102 may detect on the basis of the current drawn by the PD 104 in response to the voltage supplied to the PD 104 during the classification phase 202, whether the PD 104 is arranged for operating the lighting means 105 in the emergency operation mode.

Preferably, the detection result of this classification phase 203 is stored, in order for the PSE 102 to know, whether the PD is arranged for operating lighting means in the emergency operation phase.

Optionally, the PSE 102 may also estimate the power to be consumed by the PD 104 in the normal operation mode and/or the emergency operation mode during this classification phase 202.

For example in order to estimate the power consumption of the PD 104 in the normal operation mode, the PSE 102 supplies a certain voltage according to the PoE standard to the PD 104 via the data cable. In response thereto, the PD 104 draws respectively consumes a certain current, which indicates to the PSE 102 the power class of the PD 104, i.e. how much power the PD 104 consumes in then normal operation mode.

The PD 104 generally comprises a different, preferably lower, power consumption when operating the lighting means in the emergency operation mode compared to the power consumption when operating the lighting means in the normal operation mode. That is the power consumption of the PD 104 in the emergency operation mode is different, preferably lower, than the power consumption of the PD 104 in the normal operation mode.

Of course the power consumption of the PD 104 in the two different modes (normal operation mode and emergency operation mode) can also be classified or detected by other means known to the skilled person and the classification/detection result can be transmitted or input to the PSE 102.

The PSE 102 may comprise specific output channels which are designed to be powered specifically during emergency and to supply only PD 104 which are arranged for operating the lighting means 105 in the emergency operation mode. But as the customer may connect also other devices which are not able to operate in emergency mode the detection process described above may provide a benefit for the user.

The detection phase 201 is part of an initiation respectively setup process according to the PoE standard. According to the state of the art, an optional classification phase/process for detecting a power class of the PD 104 may be present after the detection phase 201.

Now, according to the invention, the classification phase 202 for determining or detecting whether the PD 104 is arranged for operating the lighting means 105 in the emergency operation mode is present after the detection phase 201, i.e. is part of the initiation process. In this classification phase 202 optionally the power consumption of the PD 104 in the normal operation mode and/or the emergency operation mode may be estimated.

As shown in FIG. 2 the classification phase 202 is performed after the detection phase 201, but before the operation phase 203.

After the initiation process, i.e. after the detection phase 201 and classification phase 202, the PSE 102 switches from a low voltage to its full voltage capacity (supply voltage of around 44-57 V) during a start-up period (time period >15 μs) and then supplies the supply voltage (e.g. 57 V) via the data cable 103 to the PD 104 during the operation phase 203. As shown in FIG. 2 the PD 104 is in the normal operation mode, i.e. the PD 104 operates the lighting means 105 in the normal operation mode (the state of the art is indicated by the dotted line in FIG. 2).

Detection of Emergency Operation Mode Capability of a PD

According to an alternative embodiment of the invention, now a second detection process respectively second detection phase is performed by the PSE 102 after the first detection phase 201 and before the operation phase 203. Preferably, the PSE 102 performs this second detection phase after the optional classification phase. The PSE 203 performs this second detection phase in order to detect or determine, whether the PD 104 is arranged for operating the lighting means 105 in an emergency operation mode.

During the second detection phase, the PSE 102 supplies a certain voltage of e.g. 30V via the data cable 103 to the PD 104, wherein this voltage is higher than the voltage used by the PSE 102 in the first detection phase 201, but lower than the supply voltage supplied by the PSE 102 to the PD 104 during the operation phase. Preferably, this voltage is also higher than the voltage used by the PSE 102 in the optional classification phase.

In case the PD 104 is arranged for operating the lighting means 105 in an emergency operation mode, the PD 104 draws a certain current in response to this voltage, wherein this current indicates to the PSE 102 that the PD 104 is arranged for operating the lighting means 105 in the emergency operation mode. Thus, during the second detection phase, the PSE 102 can detect on the basis of the current drawn by the PD 104 in response to the voltage supplied to the PD 104 during the second detection phase, whether the PD 104 is arranged for operating the lighting means 105 in the emergency operation mode.

Preferably, the detection result of this second detection phase is stored, in order for the PSE 102 to know, whether the PD is arranged for operating lighting means in the emergency operation phase.

According to the present invention, the second detection phase is a part of the initiation or setup process according to the PoE standard, constituted by the first detection phase 201 and the optional classification phase, i.e. the second detection phase is performed by the PSE 102 before the operational phase 203.

After the second detection phase the PSE 102 switches from voltage used by the PSE 102 in the second detection phase to its full voltage capacity (supply voltage of around 44-57 V) during a time period satisfying the PoE standard and then supplies the supply voltage via the data cable 103 to the PD 104 during the operation phase 203.

Triggering PD to Operate Lighting Means in an Emergency Operation Mode

Furthermore, according to the present invention the PSE 102 can not only detect whether the PD 104 is arranged for operating the lighting means 105 in the emergency operation mode, but the PSE 102 can also trigger during the operation phase 203 the PD 104 to operate the lighting means 105 in the emergency operation mode, in case the PSE 102 has determined or detected in the classification phase 202 that the PD 104 is arranged for operating the lighting means 105 in an emergency operation mode.

In an emergency case, the lighting means are to be operated in an emergency operation mode, in order to e.g. save electrical power. Therefore, in an emergency case during the operation phase 203, the PSE 102 can trigger the PD 104 to operate the lighting means 105 in the emergency operation mode by supplying a voltage, which is different to the supply voltage, instead of the supply voltage to the PD 104. In the following this voltage will be referred to by the wording "triggering voltage".

An emergency case may be present, when e.g. the PSE 102 is supplied from an emergency energy source, such as a battery, instead of the normal energy source, such as mains line. According to the invention an emergency case can be any event that requires the lighting means to be operated in the emergency operation mode.

The triggering voltage is higher than the voltage used in the detection phase 201, but lower than the supply voltage supplied by the PSE 102 during the operation phase 203. Preferably the triggering voltage is also higher than the voltage used by the PSE 102 in the classification phase 202.

According to the invention the triggering voltage may preferably correspond to e.g. 30V. Thus, the PSE 102 may trigger the PD 204 to operate the lighting means 105 in the emergency operation mode by supplying a voltage of e.g. 30V instead of the supply voltage of e.g. 57V during the operation phase. This is shown in FIG. 2, where the triggering voltage is supplied for a time period T1, which corresponds preferably to 50-100 ms. The triggering of the PD 104 to operate the lighting means 105 in the emergency operation mode causes a "notch" in the voltage supplied from the PSE 102 to the PD 104 (as can be seen in FIG. 2). Of course, the triggering voltage can also have different value than 30V. In FIG. 2 the possible voltage range is indicated by a two sided arrow.

In case the PSE 102 supplies during the operation phase 203 the triggering voltage instead of the supply voltage to the PD 104 via the data cable 103, the PD 104 starts to operate the lighting means 105 in the emergency operation mode, i.e. the PD 104 is triggered to operate the lighting means in the emergency operation mode during the operation phase 203.

Preferably, the PSE 102 will only trigger the PD 104 to operate the lighting means in the emergency operation mode by supplying the triggering voltage during the operation phase 203, if during the classification phase 202 the PD 104 has been detected as being arranged for operating the lighting means in the emergency operating mode.

After the PSE 102 has triggered the PD 104 to operate the lighting means 105 in the emergency operation mode, the PSE 102 may supply again the supply voltage, which is normally supplied by PSE 102 to the PD 104 in the operation phase 203, for example the maximal nominal voltage (e.g. 57V) that can be supplied by the PSE 102 to the PD 104 according to the PoE standard (as shown in FIG. 2).

Thus, according to the invention, the PD 104 operating the lighting means 105 in a normal operation mode as well as the PD 104 operating the lighting means 105 in an emergency operation mode may be supplied by the PSE 102 with the supply voltage (e.g. 57V) during the operation phase 203.

However, according to the invention the PD 104 can also be supplied with a lower voltage than the supply voltage during the operation phase 203, when operating the lighting means 105 in the emergency operation mode. In this case the voltage supplied to the PD 104 is larger than the voltage of the first detection phase 201, and preferably is larger than the voltage used in the classification phase 202. In FIG. 2 the possible voltage range is indicated by a two sided arrow.

The advantage of supplying a lower voltage than the supply voltage to the PD 104 being in the emergency operation mode is that PDs, which are also connected to the PSE 102, but are not able to operate lighting means in the emergency operation mode, are not caused by the supply voltage to operate.

Especially, the PSE 102 may supply the PD 104 operating the lighting means in the emergency operation mode with the voltage/triggering voltage that was supplied by the PSE 102 to the PD 104 for triggering the PD 104 to operate the lighting means in the emergency operation mode.

Triggering PD to Operate Lighting Means in a Normal Operation Mode

According to the invention, the PSE 102 can also trigger the PD 104, operating the lighting means in the emergency operation mode, to operate the lighting means again in a normal operation mode. As shown in FIG. 2, this trigger is performed by turning the voltage supplied to the PD 104 operating the lighting means in the emergency operation mode off and then increasing again the voltage supplied to the PD 104 to the supply voltage according to the PoE standard.

This trigger is actually caused by the circuitry of the energy source 106 supplying the PSE 102 with electric power. Namely, during the emergency operation mode, the PSE 102 is supplied with electric energy from the rechargeable battery of the energy source 106. During the normal operation mode the PSE 102 is supplied with electric power from the mains line via the energy source 106. The switching in the energy source 106 from the battery supply to the mains line supply causes the PSE 102 for a short time to not be supplied with power from the energy source 106 and, thus, the voltage supplied from the PSE 102 to the PD 104 for triggering the PD 104 to operate again the lighting means 105 in the normal operation mode drops to 0V, as shown in FIG. 2.

As can be seen in FIG. 2, when the voltage supplied by the PSE 102 to the PD 104 is increased again during the triggering of the PD 104 to operate the lighting means 105 in the normal operation mode, no initiation process is performed by the PSE 102. That is the detection phase 201 and the classification phase 202 are not performed by the PSE 102 when the PSE 102 triggers the PD 104 to operate the lighting means in the normal operation mode.

As an alternative, in case the PD 104 operating the lighting means in the emergency operation mode was supplied with a voltage smaller than the supply voltage the voltage for triggering the normal operation mode may be the supply voltage. This is advantageous, as the PD operating the lighting means in the normal operation mode is supplied with the supply voltage during the operation phase.

In case the PD 104 operating the lighting means in the emergency operation mode was supplied with the supply voltage the voltage for triggering the normal operation mode may be the triggering voltage used for triggering the emergency operation mode or a voltage smaller or lower than the supply voltage.

Of course any voltage different to the voltage supplied by the PSE 102 to the PD 104 for operating the lighting means in the emergency operation mode that is smaller or equals to the supply voltage and is greater or higher than the voltage of the first detection phase 201 and also is preferably greater than the voltage of the classification phase 202, may be supplied by the PSE 102 to the PD 104 for triggering the PD 104 to operate the lighting means again in the normal operation mode.

(According to an embodiment different to FIG. 2, the voltage supplied by the PSE 102 for triggering the normal operation mode corresponds to the triggering voltage supplied by the PSE 102 for triggering the emergency operation mode.)

Of course a voltage having a voltage level different to the triggering voltage can also be supplied by the PSE 102 to the PD 104 in order to trigger the PD 104 operating the lighting means 105 in the emergency operation mode to operate the lighting means again in the normal operation mode. Such a voltage would be higher than the voltage used or supplied by the PSE 102 during the first detection phase 201 and preferably also higher than the voltage used in the classification phase 202.

As shown by FIG. 2, the PSE 102 supplies during the operation phase 203 the triggering voltage for a certain time period T1 to trigger the PD 104 to operate the lighting means 105 in the emergency operation mode. In case the voltage supplied by the PSE 102 for triggering emergency operation mode corresponds to the voltage, which is supplied by the PSE 102 to the PD 104 in the emergency operation mode, the voltage for triggering the emergency operation mode is continued to be supplied by the PSE 102 to the PD 104 after the triggering.

Further, the triggering of the operation module to operate the lighting means again in the normal operation mode corresponds to a time period T2.

According to the invention the time periods T1 and T2 can be of the same length or can be of different lengths.

Furthermore, according to the invention, the PSE 102 can comprise either only the functionality of triggering the PD 104 to operate the lighting means 105 in the emergency operation mode or both the functionality of detecting whether the PD 104 is arranged for operating the lighting means 105 in the emergency operation mode and the functionality of triggering the PD 104 to operate the lighting means in the emergency operation mode.

In the first case, (instead of the PSE 102) means known to the skilled person can be used to determine or detect, whether the PD 104 is arranged for operating the lighting means in the emergency operation mode. The determination/detection result can then be transmitted or input to the PSE 102. Preferably, in both cases, the PSE 102 may be adapted to trigger the PD 104, operating the lighting means 105 in the emergency operation mode, to operate the lighting means 105 again in the normal operation mode.

In addition, according to the present invention, in an emergency case the PSE 102 can perform the classification process according to the classification phase 202 during the operation phase 203 before supplying the triggering voltage to the PD 104, in order to determine or detect the power consumption of the PD 104 when operating the lighting means 105 in the emergency operation mode, i.e. the power consumption of the PD 104 in the emergency operation mode, before triggering the PD 104 to operate the lighting means 105 in the emergency operation mode.

Namely, the PD 104 generally comprises a different, preferably lower, power consumption when operating the lighting means in the emergency operation mode compared to the power consumption when operating the lighting means in the normal operation mode. That is the power consumption of the PD 104 in the emergency operation mode is different, preferably lower, than the power consumption of the PD 104 in the normal operation mode.

Generally, during the classification phase 202 the PSE 102 detects the power consumption of the PD 104 in the normal operation mode, i.e. the power consumption of the PD 104 when operating the lighting means in the normal operation mode. Preferably, the classification of the power consumption of the PD 104 in the emergency operation mode can already be performed by the PSE 102 during the initialization process, preferably in the classification phase 202.

Of course the power consumption of the PD 104 in the two different modes (normal operation mode and emergency operation mode) can also be classified or detected by other means known to the skilled person and the classification/detection result can be transmitted or input to the PSE 102.

The detection respectively classification results of the detection phase 201, the classification phase 202 and the second detection phase may be stored in the PSE 102 or may be stored outside the PSE 102 in a way that the PSE 102 can easily access the detection results.

Figure 3:
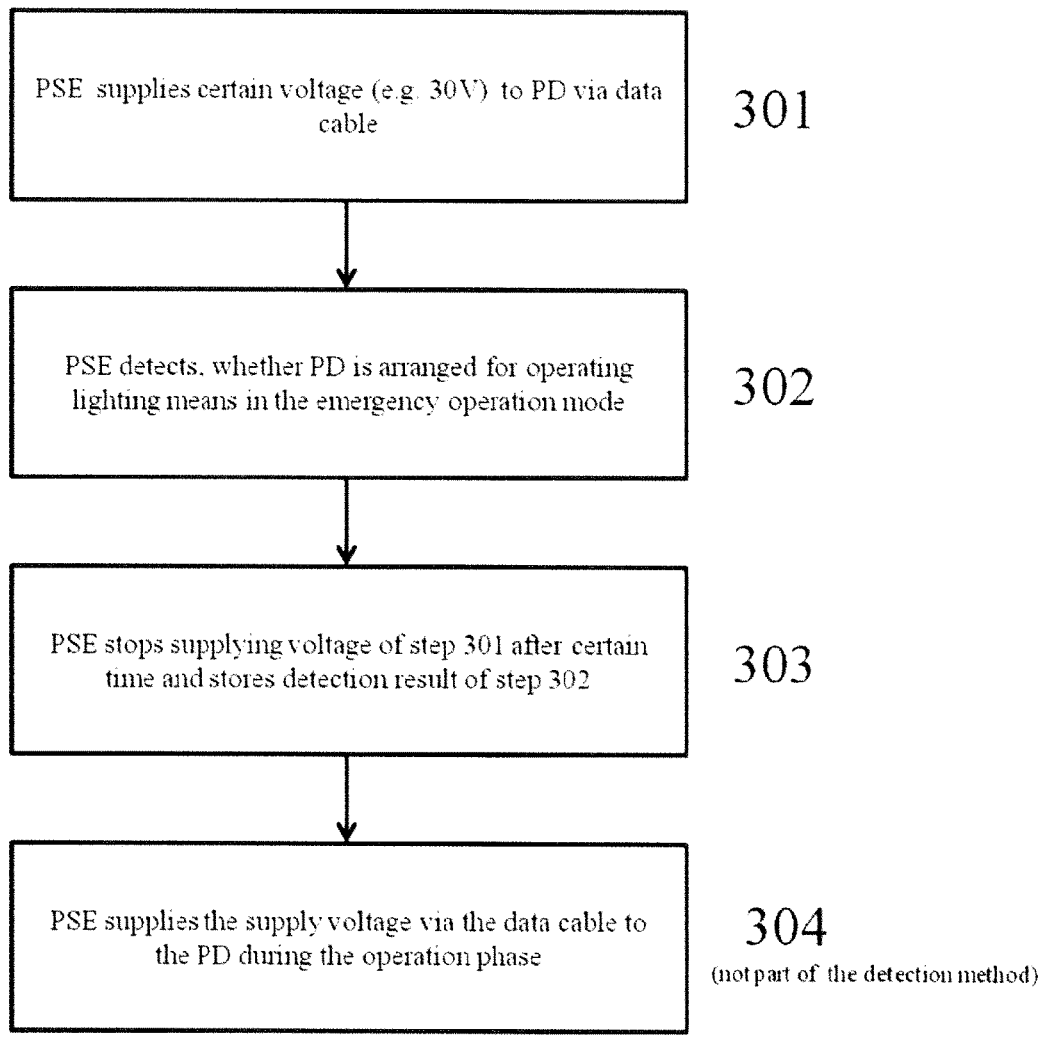
FIG. 3 shows an exemplary embodiment of the detection method for detecting whether an operation module is arranged for operating lighting means in an emergency operation mode.

FIG. 3 shows an exemplary embodiment of the detection method performed by the PSE 102 during the classification phase 202.

In the first step 301, the PSE 102 supplies a certain voltage to the PD 104 via the data cable 103. In response to this voltage the PD 104 draws a current. In case the PD 104 is arranged for operating the lighting means 105 in the emergency operation mode, a certain current will be drawn in response to the voltage supplied by the PSE 102 in step 301.

In the second step 302, the PSE 102 determines or detects, whether the PD 104 is arranged for operating the lighting means 105 in the emergency operation mode on the basis of the current drawn by the PD 104 in response to the voltage supplied by the PSE 102 in step 301.

In the third step 303, the PSE 102 stops after a certain time to supply the voltage of the first step 301 and stores the detection result of step 302. Thus, in an emergency case the PSE 102 knows, whether the connected PD 104 is arranged for operating the lighting means in the emergency operation mode.

After the detection method, the PSE 102 supplies the supply voltage to the PD 104 during the operation phase 203 (step 304 not part of the detection method).

FIG. 4 shows an exemplary embodiment of the emergency operation mode triggering method that can be performed by the PSE 102 during the operation phase 203 for triggering a PD 104 to operate the lighting means 105 in the emergency operation mode.

During the operation phase 203 the PSE 102 supplies the PD with the supply voltage (e.g. 57V) via the data cable 103 according to the PoE standard (step 400 not part of the emergency operation mode triggering method).

In the first step 401 of the emergency operation mode triggering method, the PSE 102 supplies a certain voltage or triggering voltage instead of the supply voltage. The level of this voltage is as described above.

In the second step 402, the PSE 102 stops after a certain time period T1 to supply the triggering voltage and supplies preferably again the supply voltage for supplying the PD 104. As described above, the PSE 104 can also supply to the PD 104 operating the lighting means in the emergency operation mode a voltage different to the supply voltage. For example, the PSE 102 may continue to supply the triggering voltage to the PD 104 operating the lighting means in the emergency operation mode.

What is claimed is:

1. A power supply module adapted for use in a power over Ethernet (PoE) system, wherein the power supply module is configured to:
   supply, during a detection phase, at least a first voltage via a data cable to an operation module for operating lighting means, and
   detect, during the detection phase, whether the operation module is arranged for being supplied with a supply voltage via the data cable during an operation phase,
   supply, during a classification phase, a second voltage via the data cable to the operation module,
   detect, during the classification phase, whether the operation module is arranged for operating the lighting means in an emergency operation mode, and
   supply, in the operation phase, the operation module with the supply voltage via the data cable, and, wherein the power supply module only performs the classification phase and the operation phase, if it is detected, during the detection phase, that the operation module is arranged for being supplied with the supply voltage via the data cable, the power supply module performs the operation phase after the classification phase, and the second voltage is higher than the first voltage, but lower than the supply voltage.

2. The power supply module according to claim 1, wherein the power supply module is further configured to
supply, during the operation phase, a third voltage via the data cable to the operation module in order to trigger the operation module to operate the lighting means in the emergency operation mode, wherein the third voltage is higher than the first voltage-and higher than the second voltage, but lower than the supply voltage.

3. The power supply module according to claim 1, wherein the power supply module is further configured to supply the supply voltage, the third voltage or a voltage greater than the third voltage and smaller than the supply voltage via the data cable to the operation module operating the lighting means in the emergency operation mode.

4. A power over Ethernet (PoE) system, comprising
the power supply module according to claim 1 and
an operation module comprising a powered device (PD), arranged for operating the lighting means in an emergency operation mode, and adapted for being supplied power from the power supply module wherein
the power supply module and the operation module are connected via a data cable.

5. A power supply module adapted for use in a power over Ethernet (PoE) system, wherein the power supply module is configured to:
supply, during a detection phase, at least a first voltage via a data cable to an operation module for lighting means, and
detect, during the detection phase, whether the operation module is arranged for being supplied with a supply voltage via the data cable during an operation phase,
supply, during the operation phase, a second voltage via the data cable to the operation module in order to trigger the operation module to operate the lighting means in an emergency lighting mode during the operation phase, wherein
the power supply module only performs the operation phase, if it is detected during the detection phase that the operation module is arranged for being supplied with the supply voltage via the data cable,
the power supply module performs the operation phase after the detection phase, and
the second voltage is higher than the first voltage, but lower than the supply voltage.

6. The power supply module according to claim 5, wherein the power supply module is configured to supply the supply voltage, the second voltage or a voltage that is greater than the second voltage and smaller than the supply voltage via the data cable to the operation module operating the lighting means in the emergency operation mode.

7. A power over Ethernet (PoE) system, comprising
the power supply module according to claim 5, and
the operation module comprising a powered device (PD), arranged for operating the lighting means in the emergency operation mode, and adapted for being supplied power from the power supply module, wherein
the power supply module and the operation module are connected via the data cable.

8. A detection method for detecting, in a power over Ethernet (PoE) system, whether an operation module, which is supplied with a supply voltage via a data cable from a power supply module, during an operation phase, is arranged for operating lighting means in an emergency operation mode, comprising the following steps:
supplying from a power supply module, during a detection phase, at least a first voltage via a data cable to an operation module,
detecting with the power supply module, during the detection phase, whether the operation module is arranged for being supplied with a supply voltage via the data cable during the operation phase,
supplying from the power supply module, during a classification phase, a second voltage via the data cable to the operation module,
detecting with the power supply module during the classification phase, whether the operation module is arranged for operating the lighting means in an emergency operation mode, and
supplying from the power supply module during an operation phase, the operation module with the supply voltage via the data cable, wherein
the power supply module only performs the classification phase and the operation phase, if the power supply module detects during the detection phase that the power supply module is arranged for being supplied via the data cable with the supply voltage, and
the second voltage is higher than the first voltage, but lower than the supply voltage.

9. An emergency operation mode triggering method in a power over Ethernet (PoE) system for triggering an operation module for operating lighting means to operate the lighting means in an emergency operation mode, the method comprises:
supplying the operation module with a first voltage via a data cable from a power supply module during a detection phase, and
supplying the operation module with a supply voltage via a data cable from the power supply module during the operation phase, and
supplying from the power supply module a second voltage via the data cable to the operation module during the operation phase in order to trigger the operation module to operate the lighting means in the emergency operation mode, wherein
the power supply module performs the operation phase after the detection phase, and
the second voltage is higher than the first voltage, but lower than the supply voltage.

* * * * *